(12) United States Patent
Kim et al.

(10) Patent No.: US 8,208,977 B2
(45) Date of Patent: Jun. 26, 2012

(54) MOBILE TERMINAL AND SPEAKER DEVICE THEREOF

(75) Inventors: Ji Eun Kim, Gumi-si (KR); Byoung Sun Lee, Seoul (KR); Heung Sik Yun, Gumi-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 366 days.

(21) Appl. No.: 12/491,828

(22) Filed: Jun. 25, 2009

(65) Prior Publication Data

US 2009/0325653 A1     Dec. 31, 2009

(30) Foreign Application Priority Data

Jun. 27, 2008  (KR) .................. 10-2008-0061551

(51) Int. Cl.
*H04M 1/00*     (2006.01)
(52) U.S. Cl. .................... 455/575.1; 455/90.3
(58) Field of Classification Search .... 455/575.1–575.4, 455/556.1, 90.3, 565, 74; 381/334, 386, 381/345; 361/679.27; 379/428.01, 433.08, 379/433.12, 433.13
See application file for complete search history.

(56) References Cited

U.S. PATENT DOCUMENTS

| 7,369,882 | B2 * | 5/2008 | Hwang et al. | 455/575.1 |
| 2002/0053484 | A1 * | 5/2002 | Murakami et al. | 181/293 |
| 2003/0100275 | A1 * | 5/2003 | Hsu et al. | 455/90 |
| 2006/0234786 | A1 * | 10/2006 | Taniguchi et al. | 455/575.4 |
| 2006/0270459 | A1 * | 11/2006 | Lee et al. | 455/565 |
| 2007/0105606 | A1 * | 5/2007 | Yoon et al. | 455/575.4 |
| 2007/0280497 | A1 * | 12/2007 | Isberg et al. | 381/345 |
| 2008/0025542 | A1 * | 1/2008 | Lee et al. | 381/334 |
| 2010/0210310 | A1 | 8/2010 | Inoue | |

FOREIGN PATENT DOCUMENTS

| KR | 10-2007-0002348 A | 1/2007 |
| KR | 10-0794115 B1 | 1/2008 |
| WO | 2007/060730 A1 | 5/2007 |

* cited by examiner

*Primary Examiner* — Lana N Le
*Assistant Examiner* — Golam Sorowar
(74) *Attorney, Agent, or Firm* — Jefferson IP Law, LLP

(57) ABSTRACT

A mobile terminal and a speaker device thereof are provided. The mobile terminal includes a fixed body, a moving body coupled to the fixed body and movable in a linear direction relative to the fixed body, and a speaker device fastened to one of a surface of the fixed body at which the moving body is coupled and a surface of the moving body at which the fixed body is coupled for outputting sound, wherein the sound from the speaker device is output in all directions through a gap located between the fixed body and the moving body.

10 Claims, 8 Drawing Sheets

MOBILE TERMINAL AND SPEAKER DEVICE THEREOF

PRIORITY

This application claims the benefit under 35 U.S.C. §119(a) of a Korean patent application filed in the Korean Intellectual Property Office on Jun. 27, 2008 and assigned Serial No. 10-2008-0061551, the entire disclosure of which is hereby incorporated by reference.

BACKGROUND OF THE INVENTION

1. Field of the Invention

The present invention relates to a mobile terminal. More particularly, the present invention relates to a mobile terminal in which a speaker hole is located in an unexposed surface and a speaker device thereof.

2. Description of the Related Art

In general, a mobile terminal enables a user to perform wireless communication and various functions using various application programs while the user is carrying the mobile terminal. The mobile terminal may be, for example, a personal mobile communication service terminal, Personal Digital Assistant (PDA), smart phone, International Mobile Telecommunication 2000 (IMT-2000) terminal, wireless Local Area Network (LAN) terminal and the like.

With continued development, the mobile terminal has become small in size and weight, and now includes various functions, such as Moving Picture Experts Group layer-3 (MP3) music listening, digital camera photography, navigation, and Internet connection. Accordingly, the mobile terminal is used as a complex communication terminal and is now very widely used.

Typically, the mobile terminal is provided with a speaker device. The speaker device is separately installed from a receiver for communication in the mobile terminal and is generally installed adjacent to the rear surface or the receiver of the mobile terminal.

The speaker device is used when performing communication (i.e., a speakerphone function), or when using an additional function of the mobile terminal. The additional function may be music listening through an MP3 player and program viewing through a Digital Multimedia Broadcasting (DMB) module.

In a conventional mobile terminal, a speaker device is generally installed outside of the mobile terminal. Further, in order to output sound outside of the mobile terminal and to protect the speaker device, a plurality of holes (hereinafter, a speaker hole) are located in a case of the mobile terminal at a location corresponding to the speaker device, and a protective net corresponding to the speaker holes is attached thereto.

However, in the conventional mobile terminal, because a speaker hole is located in the mobile terminal case, the mobile terminal is limited due to size and configuration of the speaker hole. That is, due to the presence of the speaker hole, various design styles of the mobile terminal are complex. In addition, when the mobile terminal case is made of a metal material, forming the speaker hole in the mobile terminal case is also complex.

Therefore, a need exists for a speaker device located in an unexposed surface of a mobile terminal.

SUMMARY OF THE INVENTION

An aspect of the present invention is to address at least the above problems and/or disadvantages and to provide at least the advantages described below. Accordingly, an aspect of the present invention is to provide a mobile terminal in which a speaker hole is located in an unexposed surface of a case of the mobile terminal.

Another aspect of the present invention is to provide a mobile terminal that increases an output of a speaker unit.

In accordance with an aspect of the present invention, a mobile terminal is provided. The mobile terminal includes a fixed body, a moving body coupled to the fixed body and movable in a linear direction relative to the fixed body, and a speaker device fastened to one of a surface of the fixed body at which the moving body is coupled and a surface of the moving body at which the fixed body is coupled for outputting sound, wherein the output from the speaker device is output in all directions through a gap located between the fixed body and the moving body.

In accordance with another aspect of the present invention, a speaker device coupled to a mobile terminal is provided. The speaker device includes at least one speaker unit for outputting sound, and an enclosure, inside of which the speaker unit is coupled thereto, wherein the enclosure is located in a closed configuration and comprises a metal material.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention illustrate a mobile terminal as a slide type mobile terminal. Further, an outside surface or an external surface of the mobile terminal denotes a portion thereof that may have contact with a user.

Figure 1A:
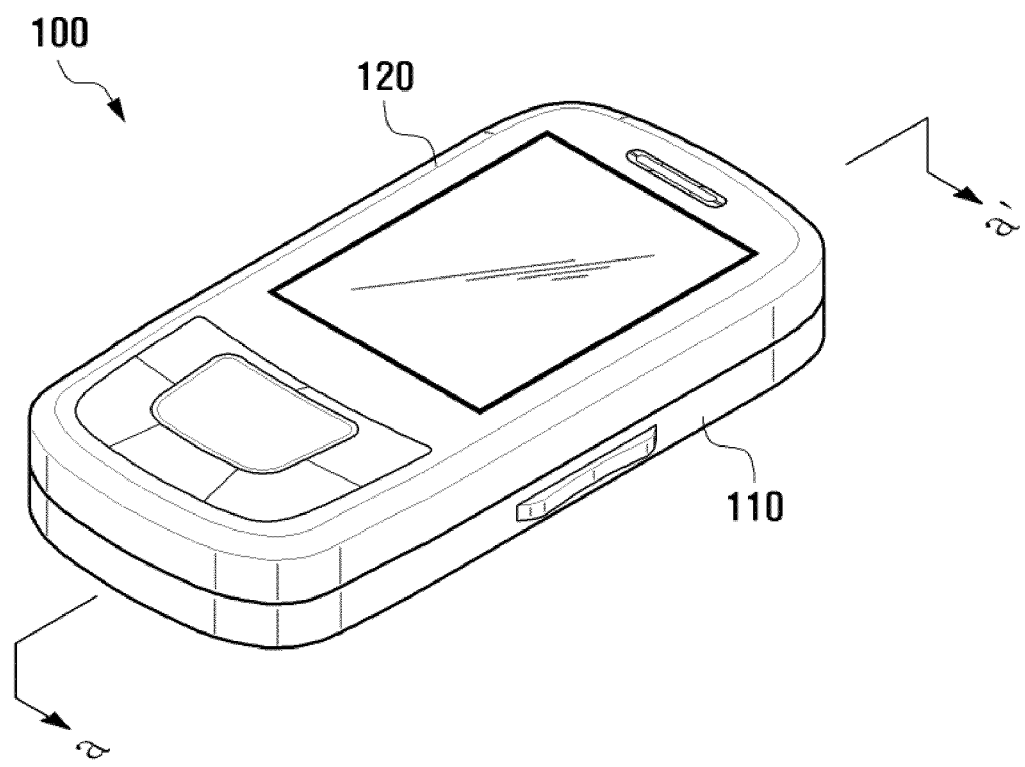
FIG. 1A is a perspective view illustrating a stacked state of a moving body and a fixed body of a mobile terminal according to an exemplary embodiment of the present invention.
Figure 1B:
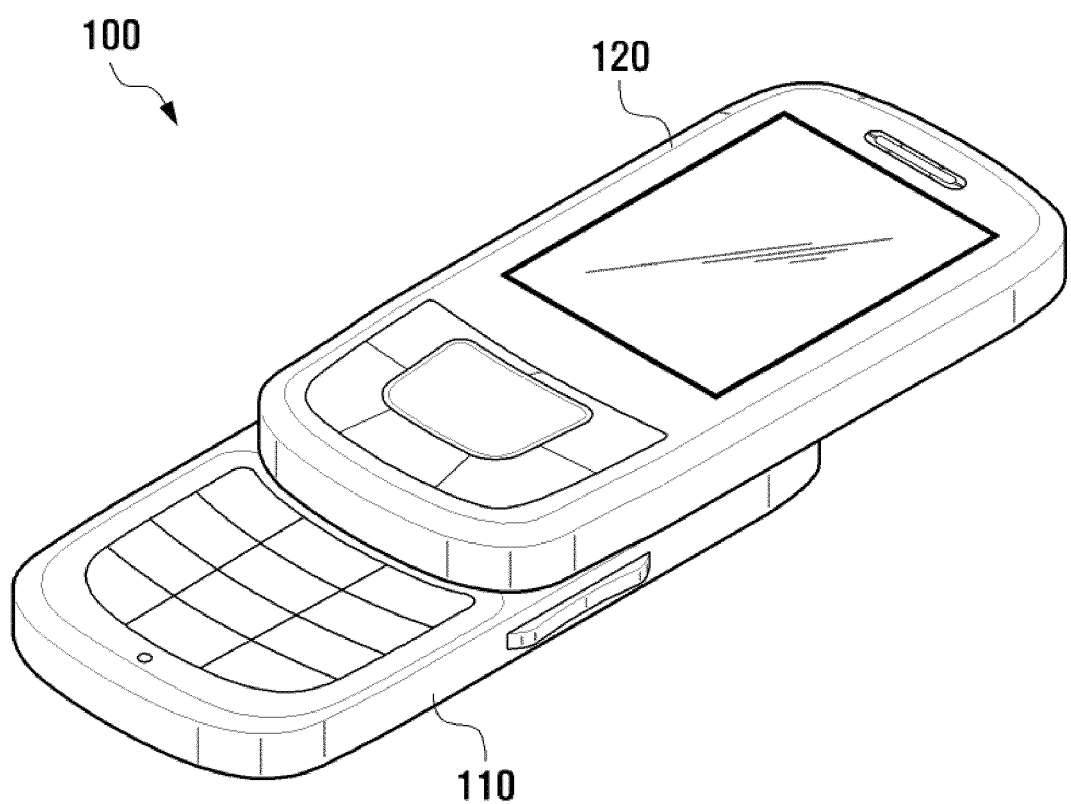
FIG. 1B is a perspective view illustrating a state where a moving body is pushed upwards from a fixed body of a mobile terminal according to an exemplary embodiment of the present invention.
Figure 1C:
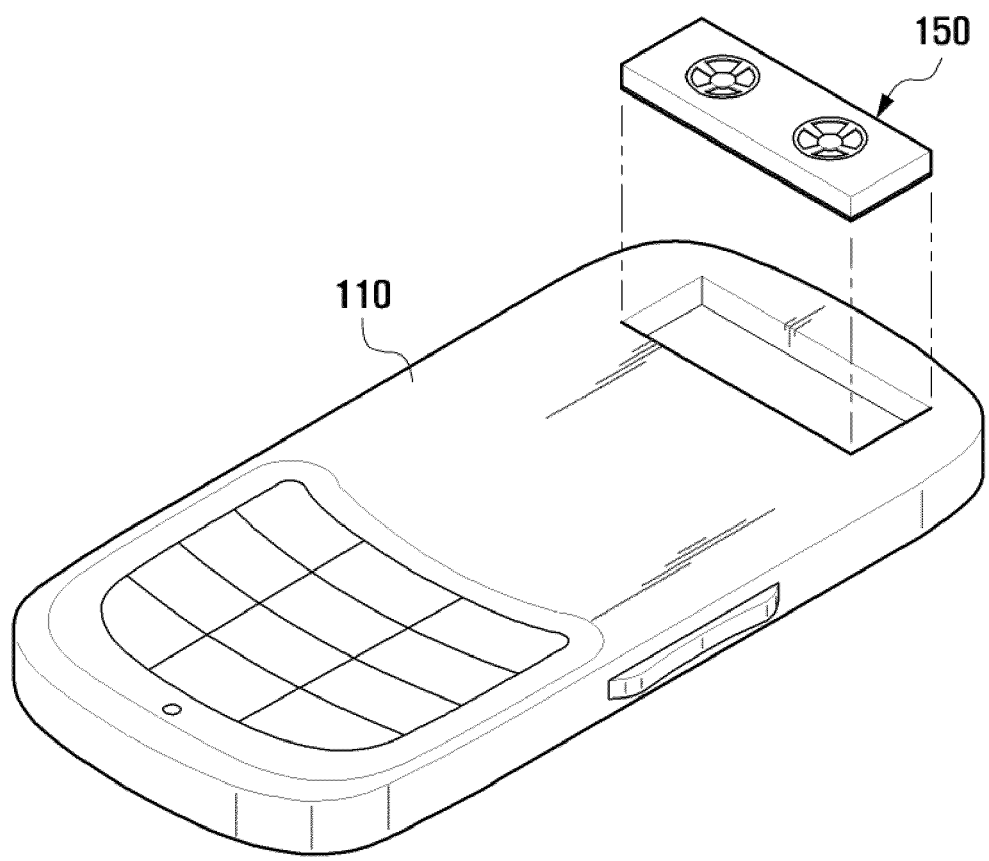
FIG. 1C is a perspective view of a fixed body of a mobile terminal according to an exemplary embodiment of the present invention.
Figure 2:
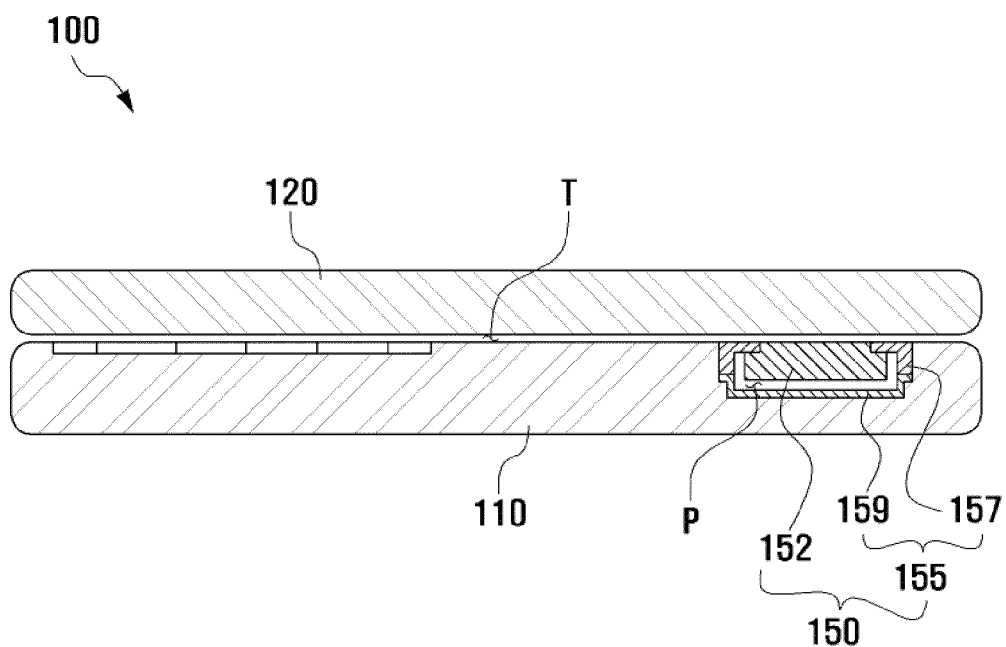
FIG. 2 is a cross-sectional view of a mobile terminal according to an exemplary embodiment of the present invention.

FIG. 1A is a perspective view illustrating a stacked state of a moving body and a fixed body of a mobile terminal according to an exemplary embodiment of the present invention. FIG. 1B is a perspective view illustrating a state where a moving body is pushed upwards from the fixed body of a mobile terminal according to an exemplary embodiment of the present invention. FIG. 1C is a perspective view of a fixed body of a mobile terminal according to an exemplary embodiment of the present invention. FIG. 2 is a cross-sectional view of a mobile terminal according to an exemplary embodiment of the present invention.

Referring to FIGS. 1A, 1B, 1C, and 2, the mobile terminal 100 includes a fixed body 110, a moving body 120 and a speaker device 150.

The fixed body 110 includes a key input unit. The key input unit has character keys for inputting numerals and characters to the mobile terminal 100, function keys for inputting and controlling various instructions and a battery (not illustrated).

The moving body 120 may be moved to an upper part and a lower part of the mobile terminal 100 in a linear direction from the fixed body 110, according to user manipulation, and includes a display means (e.g., a Liquid Crystal Display (LCD)) of the mobile terminal 100. Further, the moving body 120 has a communication key, a communication end key, a cancel key and a direction key.

The fixed body 110 and the moving body 120 are coupled such that the moving body 120 may move away from the fixed body 110 through a hinge module (not illustrated) interposed therebetween. Various forms of hinge modules are well known. Therefore, a detailed description thereof is omitted.

The speaker device 150 is fastened to one of the fixed body 110 and the moving body 120 and outputs sound. The sound is output in all directions through a gap T located between the fixed body 110 and the moving body 120.

Figure 3A:
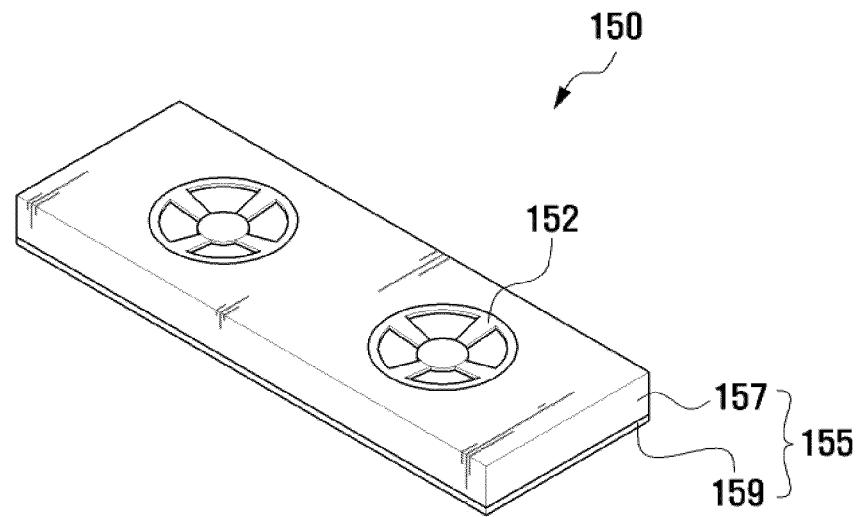
FIG. 3A is a perspective view illustrating a speaker device according to an exemplary embodiment of the present invention.
Figure 3B:
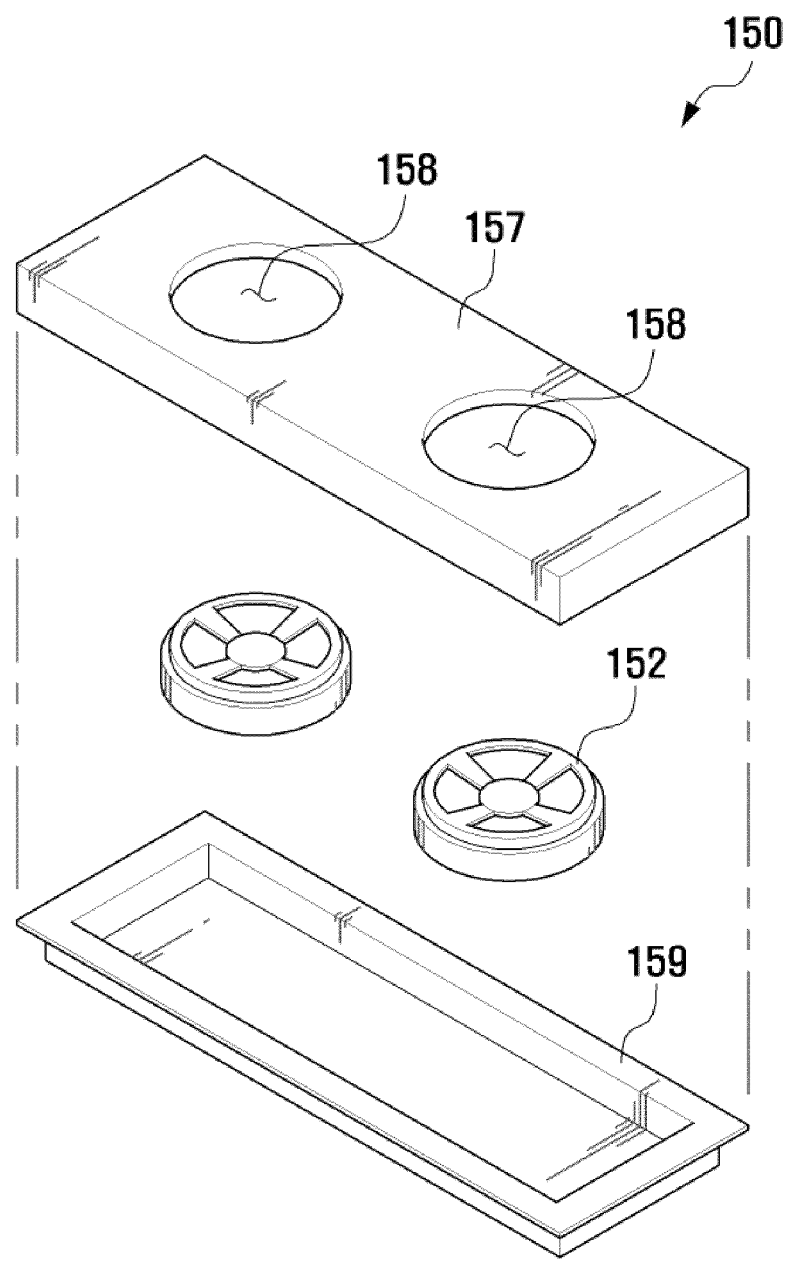
FIG. 3B is an exploded perspective view of a speaker device according to an exemplary embodiment of the present invention.

FIG. 3A is a perspective view illustrating a speaker device according to an exemplary embodiment of the present invention. FIG. 3B is an exploded perspective view of a speaker device according to an exemplary embodiment of the present invention.

Referring to FIGS. 3A and 3B, the speaker device 150 includes at least one speaker unit 152 and an enclosure 155.

The speaker unit 152 is located in a disk configuration and may be formed with a voice coil speaker. In an exemplary implementation, two speaker units 152 are included in the speaker device 150. The two speaker units 152 are used for outputting a stereophonic sound. However, the speaker device 150 is not limited thereto. For example, the speaker device 150 may be formed with one speaker unit 152 or three speaker units 152.

The enclosure 155 houses the speaker unit 152 therein to protect the speaker unit 152 from having any contact outside of the mobile terminal 100 and to shield sound radiated to the rear side of the speaker unit 152. The enclosure 155 is formed in an enclosed configuration in which the inside thereof is completely sealed when the speaker unit 152 is coupled to the speaker device 150. The enclosure 155 includes a guide frame 157 for fastening the speaker unit 152, and a sound insulation frame 159 fastened to one surface of the guide frame 157 for enclosing the rear surface of the speaker unit 152 and to secure a resonance space.

The guide frame 157 may be formed of a synthetic resin through injection molding, and each speaker unit 152 may be coupled to a corresponding hole 158 located within the guide frame 157.

In order to improve sound quality of a low sound frequency band, the enclosure 155 may be large in size. However, because it is required that the speaker unit 152, mounted in the mobile terminal 100, is small in thickness and size, the size and thickness of the enclosure 155 is limited. Further, when the sound insulation frame 159 of the enclosure 155 is positioned adjacent to the rear surface of the speaker unit 152, according to an increased internal air pressure of the enclosure 155, the amplitude of a vibration plate becomes narrow and only a high sound frequency band is reproduced.

Therefore, in an exemplary embodiment, the sound insulation frame 159 is formed with a metal material. When the sound insulation frame 159 is formed through injection molding, the sound insulation frame 159 generally has a thickness of about 0.35 mm. However, if the sound insulation frame 159 is formed of a metal material (e.g., stainless steel), the sound insulation frame 159 may have a thickness of about 0.15 mm.

Accordingly, by forming the sound insulation frame 159 of a metal material, a greater resonance space (P as illustrated in FIG. 2) within the enclosure 155 may be secured than when the sound insulation frame 159 is formed through injection molding. Accordingly, because the speaker device 150 may further secure the resonance space P within the enclosure 155, a low sound frequency band may be more effectively reproduced.

An external surface of the sound insulation frame 159 at the rear of the speaker device 150 is inserted into the fixed body 110 and fastened thereto. In this case, the speaker device 150 is installed such that it does not protrude from a coupling surface of the fixed body 110.

Because the speaker device 150 is installed at the coupling surface of the fixed body 110 of the mobile terminal 100, no speaker device or speaker hole is exposed outside of the mobile terminal 100. That is, unless the moving body 120 is disassembled from the fixed body 110, a user cannot view the speaker device 150.

Because the speaker device is installed outside of a conventional mobile terminal, a method for forming a speaker hole and installing a protection net in a case of the mobile terminal is used to protect the speaker unit, thereby reducing sound quality. However, in an exemplary implementation, the speaker device 150 in the speaker unit 152 is not installed outside of the mobile terminal. Moreover, a user cannot have contact with the speaker unit 152 when the moving body 120 is separated from the fixed body 110. Therefore, the mobile terminal 100 does not require a further component (e.g., a speaker hole or a protection net) for protecting the speaker unit 152. Further, if a separate protective device is provided, a hole corresponding to the separate protection device may be formed very large.

Accordingly, the quality of sound output from the speaker unit 152 in the mobile terminal 100 is not reduced by the separate protection device. The sound is radiated outside of the mobile terminal 100 using the gap (T as illustrated in FIG. 2) between the moving body 120 and the fixed body 110 as a resonance space. Therefore, a user may enjoy improved sound quality.

A process for outputting sound from the mobile terminal 100 according to an exemplary embodiment of the present invention is described below.

When the user requests output of a specific sound, the sound is output through the speaker unit 152. The mobile terminal 100 uses the gap T located between the fixed body 110 and the moving body 120 as a resonance space. That is, sound radiated from the speaker unit 152 resonates along the gap T located between the fixed body 110 and the moving body 120 and is output outside of the mobile terminal 100. Since the sound insulation frame 159 is made of a metal material, a low sound frequency band is output clearly through an extended resonance space P within the enclosure 155.

Here, the gap T located between the fixed body 110 and the moving body 120 is formed in all directions of the mobile terminal 100. Therefore, when sound is output from the mobile terminal 100, the sound is output in all directions in which the gap T of the mobile terminal 100 is formed and not in any one direction.

Further, in the mobile terminal 100, as illustrated in FIG. 1B, even when the moving body 120 is pushed upwards from the fixed body 110, sound is output through the gap T located between the moving body 120 and the fixed body 110. That is, the output sound is output only through the gap T located between the moving body 120 and the fixed body 110 regardless of a location of the moving body 120.

The present invention is not limited to a case where a coupling surface of the fixed body 110 and the moving body 120 is formed as a linear flat plane without having flexure. That is, the present invention may also be applied to a case where a coupling surface of the fixed body 110 and the moving body 120 of the mobile terminal has flexure.

Figure 4A:
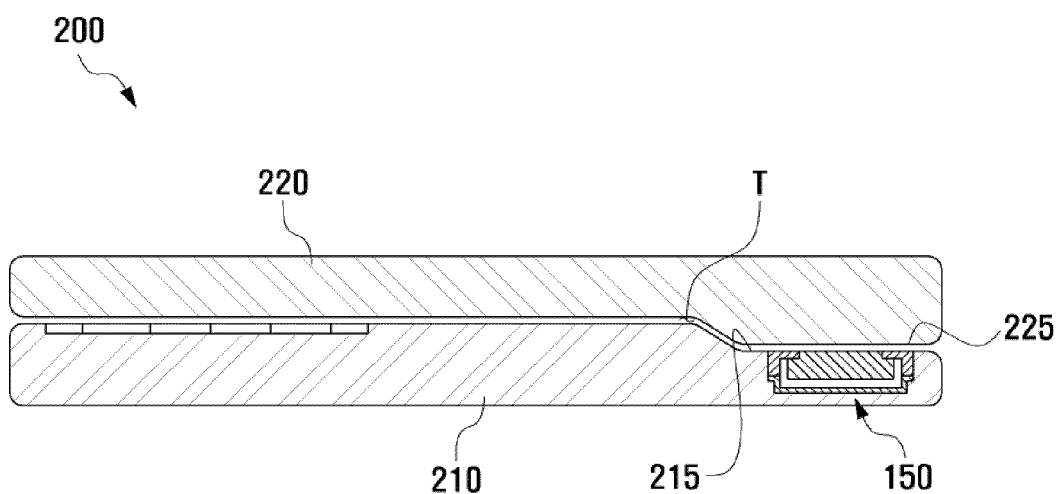
FIG. 4A is a cross-sectional view illustrating a stacked state of a moving body and a fixed body of a mobile terminal according to an exemplary embodiment of the present invention.
Figure 4B:
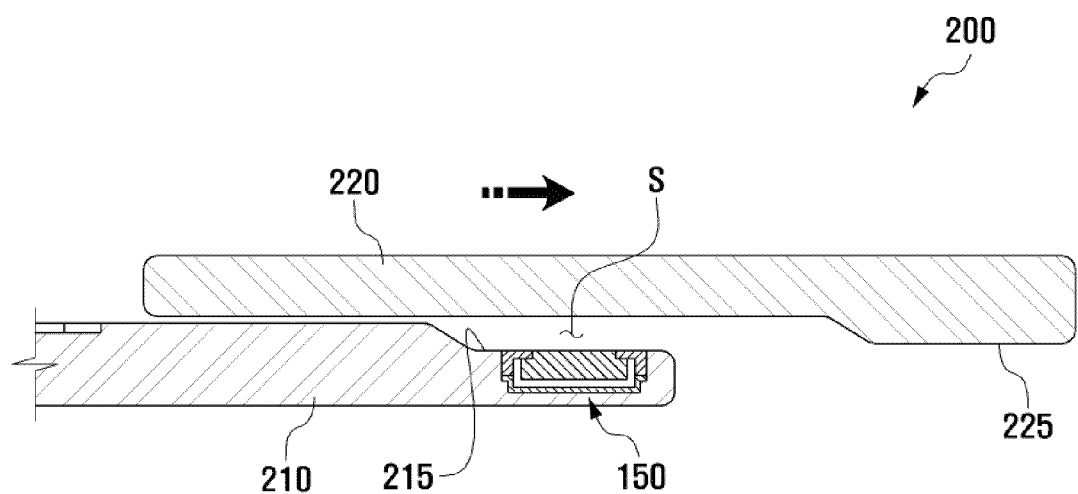
FIG. 4B is a cross-sectional view illustrating a state where a moving body is pushed upwards from a fixed body of a mobile terminal according to an exemplary embodiment of the present invention.

FIG. 4A is a cross-sectional view illustrating a stacked state of a moving body and a fixed body of a mobile terminal according to an exemplary embodiment of the present invention. FIG. 4B is a cross-sectional view illustrating a state where a moving body is pushed upwards from a fixed body of a mobile terminal according to an exemplary embodiment of the present invention.

Referring to FIGS. 4A and 4B, in a mobile terminal 200, a coupling surface of a fixed body 210 and a moving body 220 has flexure.

More specifically, the moving body 220 of the mobile terminal 200 has a protrusion portion 225 protruding towards the fixed body 210. The fixed body 210 has a concave portion 215 corresponding to the protrusion portion 225 of the moving body 220. Further, the speaker device 150 is fastened to the concave portion 215 of the fixed body 210.

In the mobile terminal 200, when the moving body 220 is pushed upwards, as illustrated in FIG. 4B, a space S of a certain size is formed in a region at which the concave portion 215 of the fixed body 210 is positioned. In such a state, when sound is output from the speaker device 150, the mobile terminal 200 outputs the sound using the space S as a resonance space. When the moving body 220 and the fixed body 210 are stacked, as illustrated in FIG. 4A, sound is output through a gap T between the fixed body 210 and the moving body 220.

In the mobile terminal 200, a difference in frequency response characteristics of an output sound exists between a state where the moving body 220 and the fixed body 210 are stacked, as illustrated in FIG. 4A, and a state where the moving body 220 is pushed upwards from the fixed body 210, as illustrated in FIG. 4B.

Figure 5A:
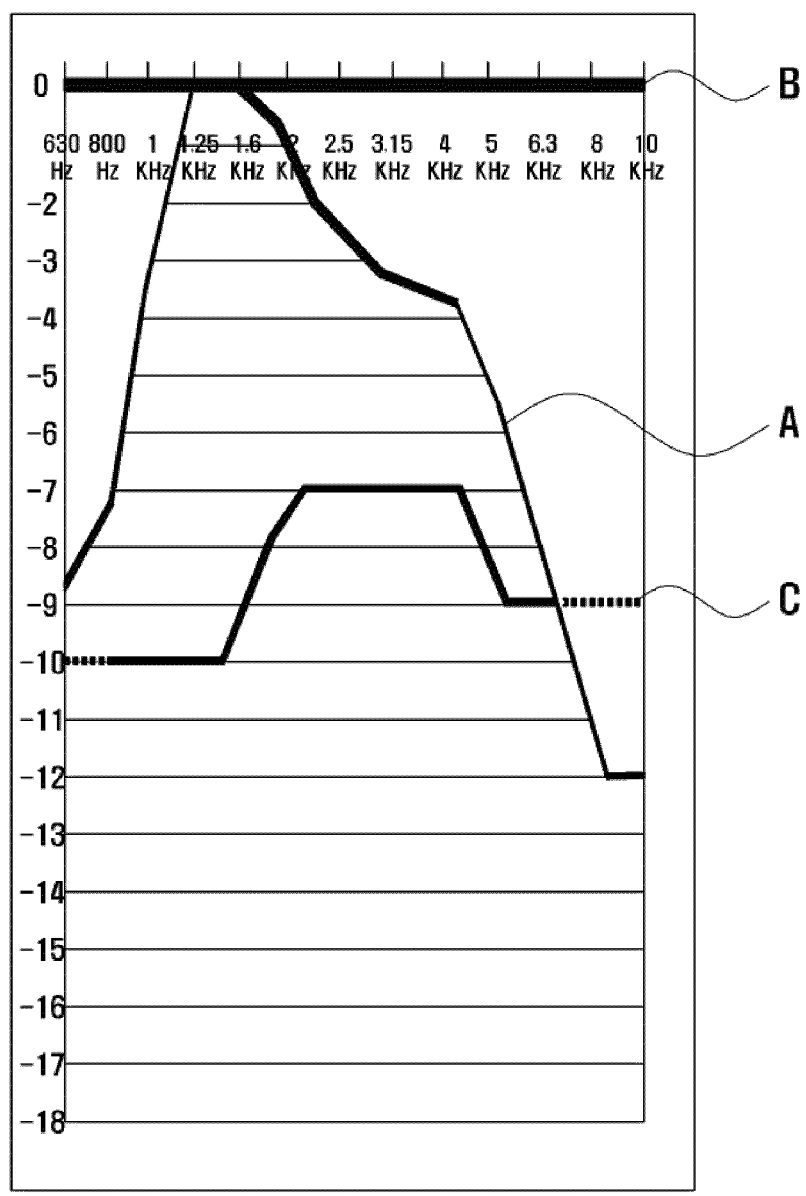
FIG. 5A is a graph illustrating frequency response characteristics of a mobile terminal illustrating a stacked state of a moving body and a fixed body according to an exemplary embodiment of the present invention.
Figure 5B:
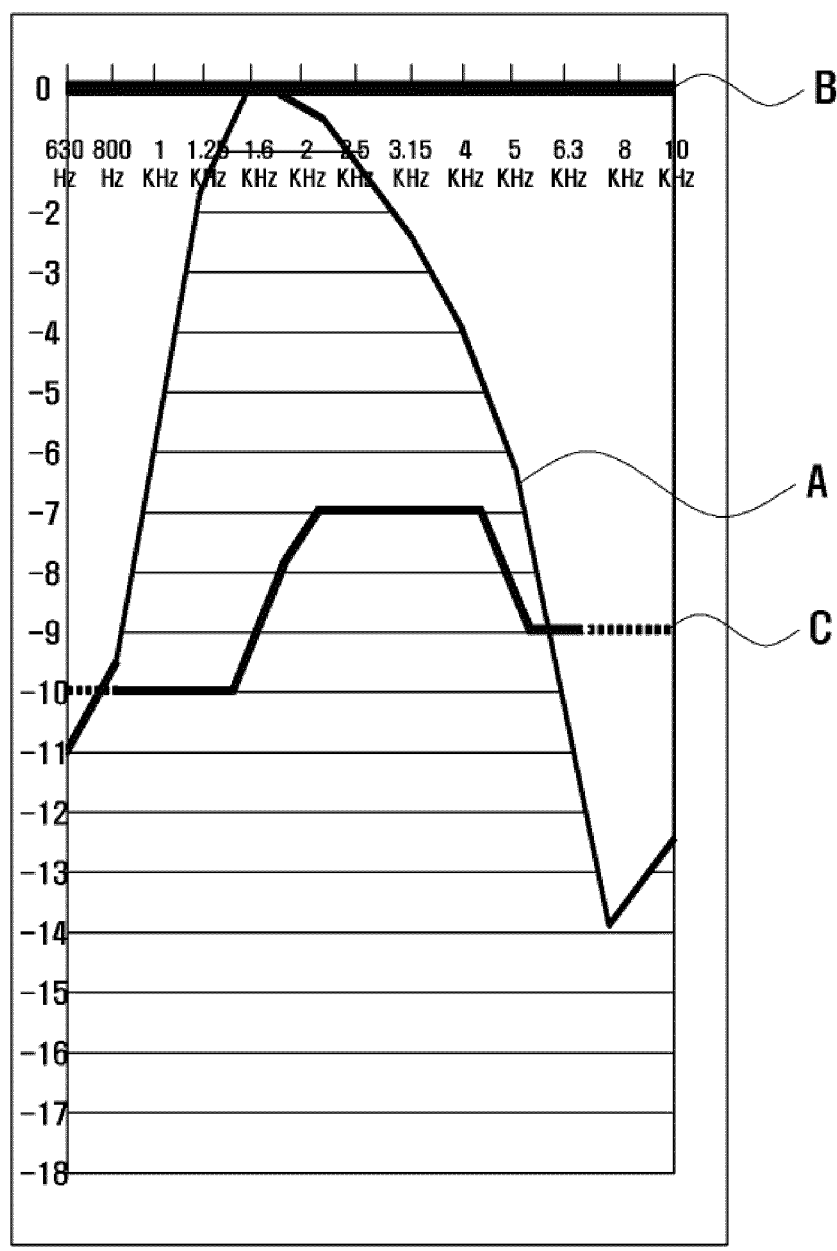
FIG. 5B is a graph illustrating frequency response characteristics of a mobile terminal illustrating a state where a moving body is pushed upwards from a fixed body according to an exemplary embodiment of the present invention.

FIG. 5A is a graph illustrating frequency response characteristics of a mobile terminal 200 illustrating a stacked state of a moving body and a fixed body according to an exemplary embodiment of the present invention. FIG. 5B is a graph illustrating frequency response characteristics of a mobile terminal illustrating a state where a moving body is pushed upwards from a fixed body according to an exemplary embodiment of the present invention.

FIGS. 5A and 5B are graphs in which sound output from the mobile terminal 200 is measured at a distance of about 10 cm from the mobile terminal 200. In the graphs, line A represents response characteristics on a frequency basis. In FIGS. 5A and 5B, when line A is positioned between reference lines (i.e., line B of an upper portion and line C of an intermediate portion), the response characteristic of a frequency corresponding to the line A is good. When line A is positioned below line C of the intermediate portion, the response characteristic of a frequency corresponding to line A is not good.

Referring to FIGS. 5A and 5B, in most frequency bands, frequency response characteristics are similar. However, in a low sound frequency band, the frequency characteristics in FIG. 5A are better than the frequency characteristics in FIG. 5B. That is, when sound is output only through a gap T between the moving body 220 and the fixed body 210, sound in a low sound frequency band is output clearly.

When sound is output from the mobile terminal 200 in a state as illustrated in FIG. 4B, most sound output from the speaker device 150 is directly output outside of the mobile terminal through the space S located at the concave portion 215 and not through the gap T between the moving body 220 and the fixed body 210. This case is similar to a case where a speaker device is located outside of a mobile terminal.

Therefore, as illustrated in the graphs of FIGS. 5A and 5B, when sound is output only through the gap T between the moving body 220 and the fixed body 210, the mobile terminal has more improved frequency response characteristics than in a conventional mobile terminal.

As described above, the mobile terminal according to exemplary embodiments of the present invention may be designed in various forms by positioning a speaker device between the moving body and the fixed body instead of exposing the speaker device outside of the mobile terminal. Further, because a gap between the moving body and the fixed body is used as a resonance space, frequency response characteristics and sound pressure of the output sound are not reduced and are improved in a low sound frequency band.

Because an external configuration of the mobile terminal may be designed without considering an external disposition of a speaker device, various designs may be applied to the mobile terminal, and output sound or sound pressure being reduced from a speaker hole or a protection net may be resolved. Further, because the output sound is radiated outside of the mobile terminal using a gap between the moving body and the fixed body as a resonance space, the mobile terminal may provide better sound quality through an improved frequency characteristic. In addition, because a speaker device is installed at a location that is not exposed to a user, the speaker device may be formed in various configurations and sizes, thereby improving the output and sound quality.

In the exemplary embodiments of the present invention, the speaker device is coupled to a fixed body. However, a location of the speaker device is not limited thereto. That is, the speaker device may be coupled to the moving body. In this case, depending on the position of the speaker device within the moving body, when the moving body is pushed upwards from the fixed body, the speaker device may be exposed outside of the mobile terminal. Therefore, a speaker unit may be damaged or broken by an external force applied to the mobile terminal. When the speaker device is installed in the moving body, the speaker device is installed at a location opposite to a keypad of the fixed body. Therefore, the speaker device is not exposed outside of the mobile terminal when the moving body is pushed upwards from the fixed body.

Further, in the exemplary embodiments of the present invention, a slide type mobile terminal is exemplified. However, the present invention is not limited thereto. That is, the present invention may be variously applied to any electronic device having a fixed body and a moving body in a slide type case and for outputting sound.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal comprising:
   a fixed body;
   a moving body coupled to the fixed body and movable in a linear direction relative to the fixed body; and
   a speaker device fastened to one of a surface of the fixed body at which the moving body is coupled and a surface of the moving body at which the fixed body is coupled for outputting sound,
   wherein the speaker device is unexposed outside of the mobile terminal, and the sound from the speaker device is output in all directions through a gap located between the fixed body and the moving body,
   wherein when the speaker device is fastened to the fixed body, the speaker device is fastened to the surface of the fixed body which is opposite the moving body, and
   wherein the speaker device comprises:
     at least one speaker unit for outputting the sound; and
     an enclosure having a rear surface fastened to the fixed body, wherein the speaker unit is coupled inside of the enclosure,
     wherein the enclosure is located in a closed configuration and comprises a guide frame to which the speaker unit is fastened, and a sound insulation frame enclosing the rear surface of the speaker unit and fastened to a surface of the guide frame to secure a resonance space.

2. The mobile terminal of claim 1, wherein the sound insulation frame comprises a metal material.

3. The mobile terminal of claim 2, wherein the sound output from the speaker device resonates using the gap as a resonance space and is output in all directions through the gap.

4. The mobile terminal of claim 3, wherein the moving body comprises a protrusion portion protruding towards the fixed body at an end portion of the moving body, and the fixed body comprises a concave portion corresponding to the protrusion portion.

5. The mobile terminal of claim 4, wherein the speaker device is coupled to the concave portion.

6. The mobile terminal of claim 1, wherein when the speaker device is fastened to the moving body, the speaker device is fastened at a location opposite a keypad coupled to the fixed body, and the moving body and the fixed body are positioned in a stacked state.

7. A speaker device coupled to a mobile terminal, the device comprising:
   at least one speaker unit for outputting sound; and
   an enclosure, inside of which the speaker unit is coupled thereto,
   wherein the enclosure is located in a closed configuration and comprises a metal material,
   wherein the speaker device is fastened to one of a surface of a fixed body of the mobile terminal at which a moving body is coupled and a surface of the moving body of the mobile terminal at which the fixed body is coupled so that the speaker device is unexposed outside of the mobile terminal,
   wherein the sound from the speaker device is output in all directions through a gap located between the fixed body and the moving body, and
   wherein the enclosure is located in a closed configuration and comprises a guide frame to which the speaker unit is fastened, and a sound insulation frame enclosing the rear surface of the speaker unit and fastened to a surface of the guide frame to secure a resonance space.

8. The device of claim 7, wherein the sound insulation frame comprises a metal material.

9. The device of claim 8, wherein the sound output from the speaker device resonates using the gap as a resonance space and is output in all directions through the gap.

10. The device of claim 9, wherein the moving body comprises a protrusion portion protruding towards the fixed body at an end portion of the moving body, and the fixed body comprises a concave portion corresponding to the protrusion portion.

* * * * *